United States Patent [19]

Koyama et al.

[11] Patent Number: 4,941,371
[45] Date of Patent: Jul. 17, 1990

[54] HYDRAULIC CONTINUOUSLY VARIABLE SPEED TRANSMISSION WITH DIRECT CLUTCH VALVE

[75] Inventors: Hideo Koyama; Koji Sasajima, both of Tokyo; Kazuya Maki, Aichi; Kouji Yamaguchi; Yoshikazu Ishikawa, both of Saitama, all of Japan

[73] Assignee: Honda Giken Kogyo Kabushiki Kaisha, Tokyo, Japan

[21] Appl. No.: 259,962

[22] Filed: Oct. 19, 1988

[30] Foreign Application Priority Data

Oct. 20, 1987 [JP] Japan .................. 62-264842
Oct. 20, 1987 [JP] Japan .................. 62-264844
Oct. 27, 1987 [JP] Japan .................. 62-271198

[51] Int. Cl.$^5$ ............................................. B60K 41/16
[52] U.S. Cl. .......................................... 74/865; 74/877; 475/76
[58] Field of Search .............. 74/681, 687, 865, 866, 74/867, 877; 192/0.073, 0.092, 3.58

[56] References Cited

U.S. PATENT DOCUMENTS

| | | | |
|---|---|---|---|
| 2,777,286 | 1/1957 | Badalini | 60/53 |
| 2,869,397 | 1/1959 | Weaving et al. | 74/681 X |
| 3,364,679 | 1/1968 | Osojnak | 60/53 |
| 3,364,680 | 1/1968 | Osojnak | 60/53 |
| 3,464,206 | 9/1969 | Badalini | 60/53 |
| 3,496,803 | 2/1970 | Whelahan | 74/687 X |
| 3,733,931 | 5/1973 | Nyman et al. | 74/687 X |
| 3,735,646 | 5/1973 | Roberts | 74/687 |
| 3,990,327 | 11/1976 | Margolin | 74/687 |
| 4,091,690 | 5/1978 | Miyao | 74/865 |
| 4,246,806 | 1/1981 | Reynolds et al. | 74/687 |
| 4,368,653 | 1/1983 | Mizuno et al. | 74/687 X |
| 4,444,093 | 4/1984 | Koga et al. | 91/488 |
| 4,646,520 | 3/1987 | Furumoto et al. | 60/469 |
| 4,776,233 | 10/1988 | Kita et al. | 74/687 |
| 4,781,022 | 11/1988 | Hayashi et al. | 60/489 |

FOREIGN PATENT DOCUMENTS

| | | |
|---|---|---|
| 0056865 | 8/1982 | European Pat. Off. . |
| 0127085 | 12/1984 | European Pat. Off. . |
| 2118936 | 2/1973 | Fed. Rep. of Germany . |
| 2363762 | 6/1975 | Fed. Rep. of Germany . |
| 3323694 | 1/1985 | Fed. Rep. of Germany . |
| 32-7159 | 9/1957 | Japan . |
| 52-106065 | 6/1977 | Japan . |
| 52-106066 | 6/1977 | Japan . |
| 54-134252 | 10/1979 | Japan . |
| 55-14312 | 1/1980 | Japan . |
| 55-1294 | 10/1980 | Japan . |
| 57-70968 | 5/1982 | Japan . |
| 58-149459 | 9/1983 | Japan . |
| 61-207229 | 9/1986 | Japan . |
| 62-167970 | 7/1987 | Japan . |
| 2158542 | 11/1985 | United Kingdom . |

Primary Examiner—Leslie A. Braun
Assistant Examiner—Chris Campbell
Attorney, Agent, or Firm—Lyon & Lyon

[57] ABSTRACT

A hydraulic continuously variable speed transmission with a direct clutch valve comprises a hydraulic pump, a hydraulic motor, a hydraulic closed circuit for hydraulically connecting the both, a direct clutch valve placed in the closed circuit, a speed reduction ratio control actuator, and a direct clutch valve controlling device for controlling operations of said direct clutch valve to block the closed circuit when the speed reduction ratio becomes substantially "1". The direct clutch valve controlling device maintains a direct connecting state when an actual engine speed is higher than a direct clutch disconnecting reference engine speed at the speed reduction ratio of approximately "1". Then, the direct clutch valve control device releases the blocking of the closed circuit by the direct valve when a drop of the actual engine speed from the direct clutch disconnecting reference engine speed exceeds a predetermined amount corresponding to the vehicle speed.

13 Claims, 10 Drawing Sheets

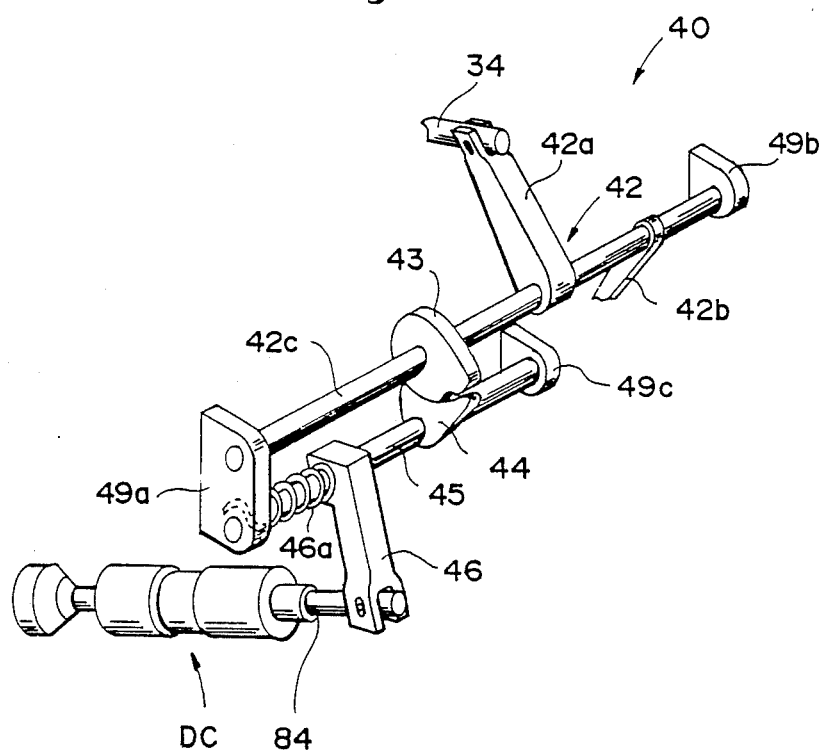

HYDRAULIC CONTINUOUSLY VARIABLE SPEED TRANSMISSION WITH DIRECT CLUTCH VALVE

BACKGROUND OF THE INVENTION

The present invention relates to a hydraulic continuously variable speed transmission comprising a constant displacement hydraulic pump and a variable displacement hydraulic motor, and more particularly to a continuously variable speed transmission provided with a direct clutch for blocking a hydraulic closed circuit, through which the pump is hydraulically connected to the motor, to render the both in a direct connecting state when a speed reduction ratio of the variable speed transmission has become 1.

Continuously variable speed transmissions have conventionally been proposed in publications in the Japanese Official Gazette such as Japanese Patent Publication No. 32(1957)-7159, Japanese Patent Publication No. 56(1981)-50142 and the like, wherein a constant displacement hydraulic pump is connected to an input shaft, oil delivered from the pump is fed to a variable displacement hydraulic motor through a closed circuit, and the hydraulic pump is driven to drive an output shaft connected thereto.

It is known to provide a direct clutch which is capable of blocking the above hydraulic closed circuit, whereby the direct clutch device blocks the hydraulic closed circuit to integrally rotate the pump and the motor when the swash plate angle for variably controlling the displacement of the hydraulic motor is minimized (and the speed reduction ratio of the variable speed transmission becomes 1).

A method for controlling a continuously variable speed transmission having a direct clutch device, as disclosed in Japanese Patent laid-open Publication No. 54(1979)-134252 and Japanese Patent laid-open Publication No. 55(1980)-14312, comprises controlling the speed reduction ratio in such a way that the engine speed coincides with a reference engine speed corresponding to the throttle opening to obtain minimum fuel consumption and blocking the closed circuit by the direct clutch device to integrally rotate the pump and the motor when the speed reduction ratio becomes minimum or 1.

In controlling the direct clutch, as described above, when the direct clutch blocks or opens the closed circuit (when it is switched ON or OFF) at a speed reduction ratio of 1, the load of the engine is changed because of change of the hydraulic thrust forces acting on the motor plungers and change of the volumetric efficiency. Therefore the following problems may be produced in the ON/OFF control of the direct clutch.

After the direct clutch is switched ON at a speed reduction ratio of "1", a direct clutch disconnecting reference engine speed is set according to the engine throttle opening and then the direct clutch is switched OFF when the actual engine speed becomes smaller than the reference engine speed. When the direct clutch is switched OFF, the hydraulic thrust forces onto the motor plungers are, as described above, restored (increased) and the volumetric efficiency is decreased. Accordingly the engine speed is increased and the actual engine speed becomes higher than the reference engine speed to switch the direct clutch ON causing a "hunting" phenomenon. When tires are locked by aggressive braking in the state of the direct clutch being switched ON (the closed circuit being blocked), the engine may be stalled since it takes at least some time to relieve the blocking of the closed circuit by the direct clutch valve (i.e., it takes some time to switch the direct clutch valve OFF).

The reason for engine stall during aggressive braking in a prior art transmission equipped vehicle is that the vehicle speed is reduced with the direct clutch valve being switched ON and with the speed reduction ratio being minimum. Because the accelerator pedal is released during aggressive braking to make the throttle opening nearly fully closed, therefore the reference engine speed is lowered according to the throttle opening. In addition, since the outlet of the hydraulic pump is closed as long as the direct clutch valve is switched ON, the main clutch valve, which is used to communicate the outlet of the hydraulic pump with the inlet thereof, is inoperative even if it is opened. Therefore, the problem in the prior art of the engine stall during aggressive braking cannot be solved.

SUMMARY OF THE INVENTION

It is an object of the present invention to provide a continuously variable speed transmission that enables smooth switching of a direct clutch valve from ON to OFF without producing a hunting phenomenon.

It is another object of the present invention to provide a continuously variable speed transmission which can be controlled without causing engine stall even when aggressive braking occurs in the ON-state of a direct clutch valve.

In the continuously variable speed transmission according to the present invention, once the direct clutch valve is switched on, the direct clutch valve controlling device maintains an ON-state of the direct clutch valve by blocking a closed circuit as long as an actual engine speed is higher than a direct clutch disconnecting reference engine speed set in accordance with a parameter representing a driver's intention of acceleration, at a speed reduction ratio of approximately 1. The blocking of the closed circuit is released when the actual engine speed drops more than a predetermined value from the direct clutch disconnecting reference engine speed.

In the continuous variable speed transmission described in another embodiment of the present invention, the direct clutch valve controlling device is adapted to release the blocking of the closed circuit by the direct clutch valve when a vehicle speed (or an engine speed) detected by a vehicle (or engine) speed detecting means is lower than a predetermined speed and an accelerator opening detected by an accelerator opening detecting means is substantially fully-closed during running with the closed circuit blocked by the direct clutch valve.

In this case, the predetermined speed is desirably set higher when the vehicle brakes are applied than when the vehicle brakes are not applied.

The phrase "accelerator opening" used in the specification and claims means an accelerator pedal opening depressed dependent upon the driver's accelerating intention or an engine throttle valve opening responsive to the depression of accelerator pedal. The accelerator opening is fully closed when the accelerator pedal is completely released and fully opened when it is completely depressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by may of illustration only, and thus are not limitative of the present invention and wherein:

FIG. 5 is a perspective view showing a link mechanism;

DESCRIPTION OF THE PREFERRED EMBODIMENTS

Figure 1:
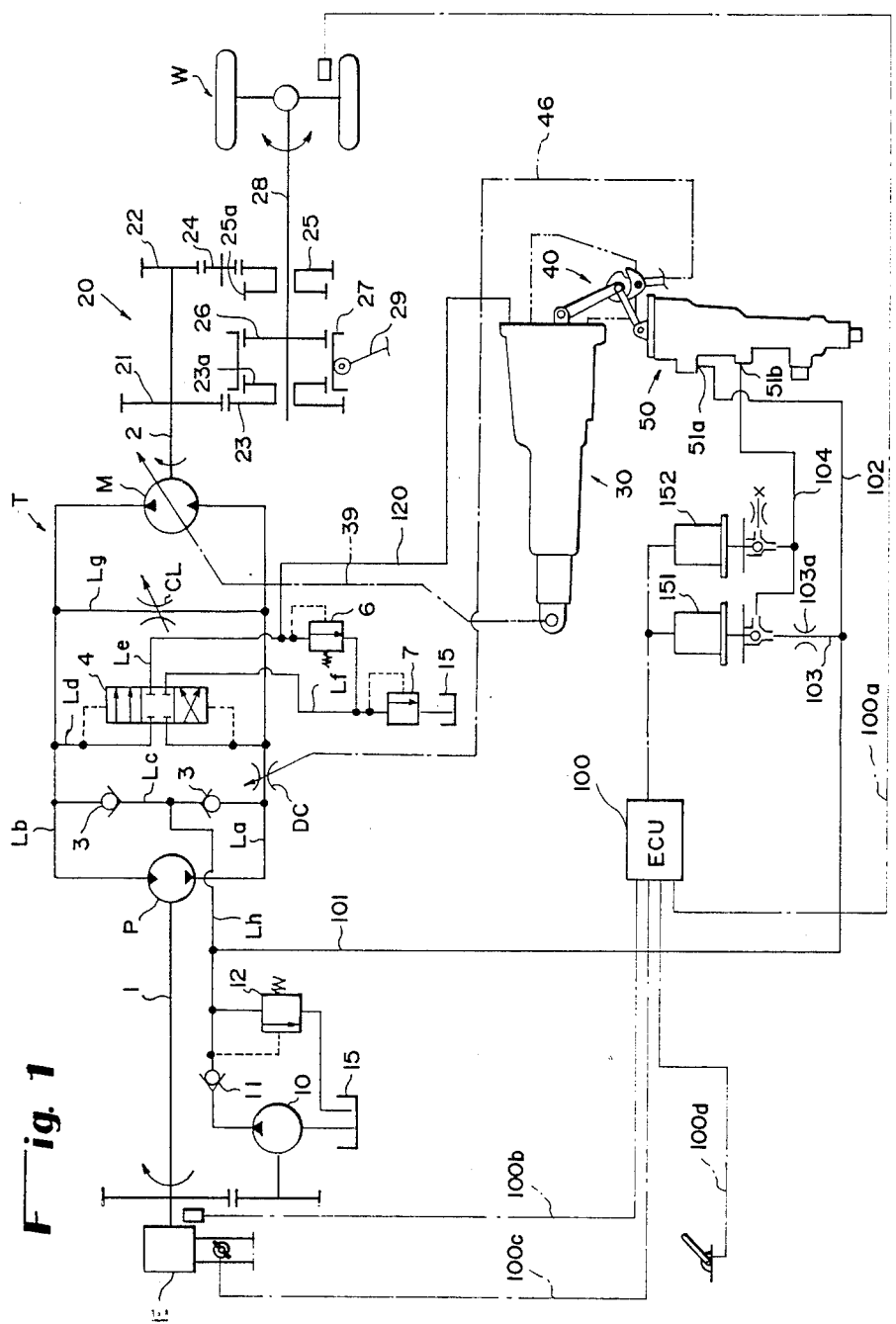
FIG. 1 is a hydraulic circuit diagram of a continuously variable speed transmission having a direct clutch device according to the present invention.

A hydraulic circuit diagram of a continuously variable speed transmission with a direct clutch unit in accordance with the present invention is presented in FIG. 1 wherein the continuously variable speed transmission T has a constant displacement swash plate type axial plunger hydraulic pump P driven by an engine E through an input shaft 1 and a variable displacement swash plate type axial plunger hydraulic motor M which drives wheels W through a directional change unit 20. The pump P and the motor M are connected with each other by means of two hydraulic lines La and Lb composing a closed hydraulic circuit wherein the first line La connects the pump outlet port to the motor inlet port and the second line Lb connects the pump inlet port to the motor outlet port. The internal pressure of the first line La is high when the engine E drives the wheels W through the pump P and the motor M (the internal pressure of the second line Lb is low at this time). On the other hand, the internal pressure of the second line Lb is high when the engine E is driven by the wheels W creating engine braking phenomenon (the internal pressure of the first line La is low at this time). The engine braking phenomenon occurs during a deceleration state of the vehicle, for example.

Further, a direct clutch valve DC which can block the first line La is placed in the first line La.

An outlet port of a charge pump 10 which is driven by the engine E is connected to the closed hydraulic circuit through a charge line Lh having a check valve 11 and a third line Lc having a pair of check valves 3, 3. The oil pumped up from an oil sump 15 by the charge pump 10 and regulated in pressure by a charge pressure relief valve 12 is fed to the one of the two lines La and Lf which has lower hydraulic pressure in it by means of the check valves 3, 3. A fourth line Ld having a shuttle valve 4 is also connected to the closed hydraulic circuit. The shuttle valve 4 is connected to the oil sump 15 through a fifth line Le and a sixth line, Lf having a high pressure relief valve 6 and a low pressure relief valve 7, respectively. The shuttle valve 4 is a 2-port 3-position type control valve and is functioned by the difference of the pressures inside the first and the second lines La and Lb. Therefore, either of the two lines La and Lb which has higher pressure is connected to the fifth line Le and the oil pressure in it is regulated by the high pressure relief valve 6. The other of the two lines and Lb which has lower pressure is connected to the sixth line Lf and the oil pressure in it is regulated by the low pressure relief valve 7.

In a seventh line Lg, through which the first line La is connected to the second line Lb, is placed a main clutch valve CL made of a variable throttle valve which controls the opening of the seventh line Lg.

An output shaft 28 connected to the wheels W is placed in parallel with the drive shaft 2 of the hydraulic motor M. A directional change gear unit 20 is placed between these two shafts 2 and 28. This gear unit 20 comprises a first drive gear 21 and a second drive gear 22 firmly mounted on the drive shaft 2 leaving an axial space therebetween, a first driven gear 23 rotatably mounted on the output shaft 28 and engaged with the first drive gear 21, a second driven gear 25 rotatably mounted on the output shaft 28 and engaged with a intermediate gear 24 which is engaged with the second drive gear 22, a clutch hub 26 placed between the first and second driven gears 23, 25 and firmly mounted on the output shaft 28, and a sleeve 27 slidably mounted on the clutch hub 25 which can be selectively engaged with clutch gears 23a, 25a formed on the sides of the driven gears 23, 25. The sleeve 27 can be moved laterally by a shift fork 29. In the directional change gear unit 20, when the sleeve 27 is slid leftward by the shift fork 29, the clutch gear 23a of the first driven gear 23 is connected to the clutch hub 26 by means of the sleeve 27 (as shown in FIG. 1). Hence the rotational direction of the output shaft 28 is opposite to that of the drive shaft 2 and the wheels W are driven forward by the continuously variable speed transmission T. On the other hand, when the sleeve 27 is slid rightward by the shift fork 29, the clutch gear 25a of the second driven gear 26 is connected to the clutch hub 25 by means of the sleeve 27. Hence, the rotational direction of the output shaft 28 is the same as that of the drive shaft 2 and the wheels W are driven rearward.

Actuators which control the variable displacement of the hydraulic motor M to adjust the speed reduction ratio of the transmission are a first and a second servo unit 30, 50 which are connected by a link mechanism 40 with each other. These units 30, 50 are also used to control the operation of the direct clutch valve DC.

The operations of the servo units 30, 50 are controlled by a pair of solenoid valves 151, 152 which are actuated by duty cycle signals from a controller 100. Signals correspondig to vehicle speed V (sent through a line 100a), engine speed Ne (sent through a line 100b), engine throttle opening degree $\theta$th (sent through a line 100c), swash plate angle $\theta$tr of the hydraulic motor M, manual shift lever position Psl, brake actuation BR (sent through a line 100d) and opening degree $\theta$cl of the direct clutch valve DC are inputted into the controller 100. Based on these input signals, the controller 100 outputs duty cycle signals to the above solenoid valves to effectuate desirable traveling control.

Figure 2:
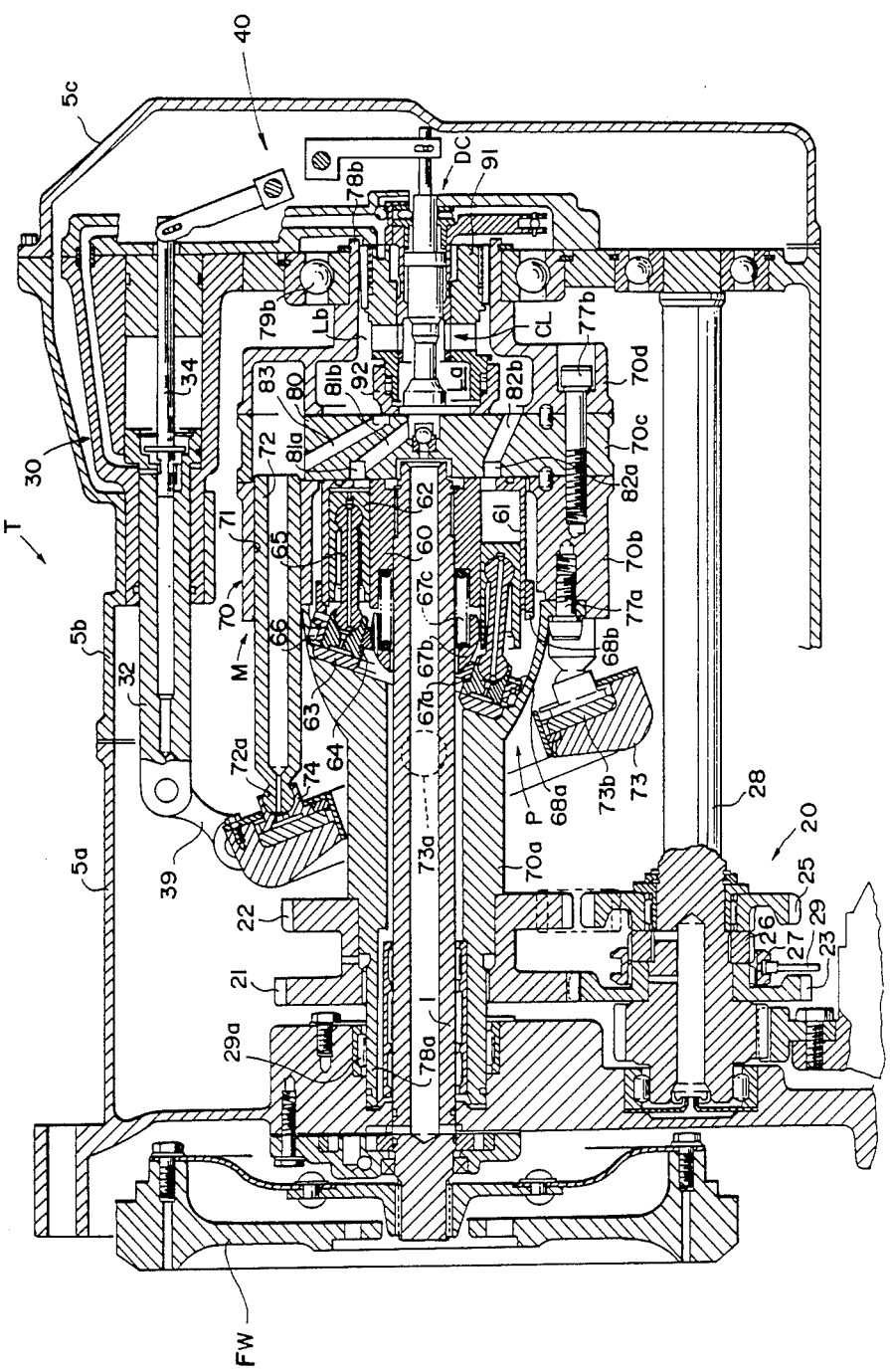
FIG. 2 is cross-sectional view of the continuously variable speed transmission.

A sectional view of the continuously variable speed transmission T is presented in FIG. 2 wherein the transmission T includes the hydraulic pump P and the hydraulic motor M which are coaxially placed in a space surrounded by cases 5a, 5b and a cover 5c.

The hydraulic pump P comprises a pump cylinder 60 splinejointed with the input shaft 1, a plurality of cylinder holes 61 being formed in the pump cylinder 60 equally spaced along the circumferential plane, and a plurality of pump plungers 62 inserted into the cylinder holes 61. The pump P is driven by the engine E through a flywheel Fw to which the input shaft 1 is connected.

The hydraulic motor M comprises a motor cylinder 70 which encircles the pump cylinder 60, a plurality of cylinder holes 71 being formed in the motor cylinder 70 equally spaced along the circumferential plane which coaxially encircles the pump cylinder 60, and a plurality of motor plungers 72 inserted in the cylinder holes 71. The hydraulic motor M can be relatively rotated on the axis of the pump cylinder.

The motor cylinder 70 has a pair of support shafts 78a, 78b at both ends. These support shafts 78a, 78b are rotatably sustained by the case 5a, 5b with a needle bearing 79a and a ball bearing 79b. The support shaft 78a is the same thing as the output shaft 2. The first and the second drive gears 21, 22 of the directional change gear unit 20 are mounted on the support shaft 78a (the output shaft 2) by means of a spline-joint.

On the left inside surface of the motor cylinder 70 is firmly mounted a pump swash plate 63 being inclined at a predetermined angle. An annular pump shoe 64 is slidably mounted on the pump swash plate 63. The pump plungers 62 are swingably connected to the pump shoe 64 by means of connecting rods 65 which have ball joints at both ends.

The annular pump shoe 64 is rotatably supported by the motor cylinder 70 with a needle bearing 66 placed along the periphery of the pump shoe 64. The pump shoe 64 is pushed against the pump swash plate 63 by a spring 67c through a retaining ring 67a and a spring support 67b which have spherical contact surfaces. Accordingly the pump shoe 64 can be rotated on the pump swash plate 63.

Two bevel gears 68a, 68b having the same number of teeth and engaging with each other are fixed on the pump shoe 64 and the pump cylinder 60 respectively. When the pump cylinder 60 is driven by the engine E through the input shaft 1, the pump shoe 64 is also driven by means of the two bevel gears 68a, 68b. While the pump cylinder and the pump shoe are rotated, the pump plungers 62 which run on the ascending side of the inclined pump swash plate 63 are contracted (intake condition) and the pump plungers 62 which runs on the descending side of the pump swash plate 63 are expanded (exhaust condition).

A motor trunnion plate 73 which is opposite the motor plungers 72 is placed inside the cases 5a, 5b and supported swingably by the cases 5a, 5b around the trunnion axis 73a which is perpendicular to the surface of the drawing (FIG. 2). Motor shoes 74 are slidably placed on the swash plate 73b of the trunnion plate 73 and swingably connected to the ball joint portions 72a formed at the ends of the motor plungers 72.

According to reciprocating motions of the motor plungers 72, the motor cylinder 70 is rotated. When the tilt angle of the motor trunnion plate 73 is varied as discussed below, the strokes of the motor plungers 72 are varied from 0 to maximum. The strokes are 0 when the motor trunnion plate 73 is perpendicular to the axes of the motor plungers 72 and are maximum when the tilt angle is maximum as shown in FIG. 2.

The motor cylinder 70 consists of a first, a second, a third and a fourth section 70a, 70b, 70c, and 70d, respectively. The support shaft 78a is formed on the first section 70a and the pump swash plate 63 is placed inside the first section 70a. The cylinder holes 71 in which the motor plungers 72 are inserted are formed in the second section 70b. A distribution plate 80 having hydraulic lines which communicate with the cylinder holes 61, 71 is formed in the third section 70c. The support shaft 78b is formed in the fourth section 70d. These sections 70a, 70b, 70c, 70d are positioned by fits and pins and joined together by bolts 77a, 77b.

The pump cylinder 60 is pushed against the third section 70c (the distribution plate 80) by the biasing force of the spring 67c to prevent oil leakage from the contact surfaces.

In the fourth section 70d having the support shaft 78b is formed a hollow space where a fixed shaft 91 is inserted. A distribution ring 92 which is in contact with the distribution plate 80 is eccentrically mounted at the left end of the fixed shaft 91. The hollow space in the fourth section 70d is divided into two chambers defining an inner chamber and an outer chamber, the inner chambers being a part of the first line La and the outer chamber being a part of the second line Lb.

A pump exhaust port 81a and a pump intake port 82a are formed in the distribution plate 80. The cylinder holes 61 of the pump plungers 62 which are in the exhaust condition communicate with the first line La through the exhaust port 81a and the exhaust line 81b connected thereto. Also, the cylinder holes of the pump plungers 62 which are in the intake condition communicate with the second line Lb through the intake port 82a and the intake line 82b connected thereto. Further, a first line (not shown) and a second line 83 are formed in the distribution plate 80. The cylinder holes 71 of the motor plungers 72 which are in the expansion condition communicate with the first line La through the first line. The cylinder holes 71 of the motor plungers 72 which are at the contraction condition communicate with the second line Lb through the second line 83.

Accordingly, the hydraulic pump P and the hydraulic motor M are connected with each other by the closed hydraulic circuit which is formed in the distribution plate 80 with the use of the distribution ring 92. When the pump cylinder is driven by the engine E through the input shaft 1, the pressurized oil exhausted by the pump plungers 62 is fed to the cylinder holes 71 of the motor plungers 72 which are in the expansion condition through the exhaust port 81a, the exhaust line 81b, the first line La and the first line (not shown). Also, the oil exhausted by the motor plungers which are in the contraction condition is fed to the cylinder holes 61 of the pump plungers 62 which are in the intake condition through the second line 83, the second line Lb, the intake line 82b and the intake port 82a. The reaction torque applied to the motor cylinder 70 by the pump plungers 62 which are in the exhaust condition and the reaction torque applied to the motor plungers 72 which are in the expansion condition drive the motor cylinder 70.

Speed reduction ratio can be calculated according to the following equations:

S.R. Ratio = (speed of pump cylinder 60)/(speed of motor cylinder 70)
= 1 + (displacement of motor M)/(displacement of pump P)

Thus, if the displacement of the hydraulic motor M is varied, the speed reduction ratio (S.R. Ratio) can be varied from 1 (minimum) to maximum.

Displacement of the hydraulic motor M is determined in accordance with the stroke of motor plungers 72. Therefore, the speed reduction ratio can be varied steplessly by controlling tilt angle of the trunnion plate 73.

Figure 3:
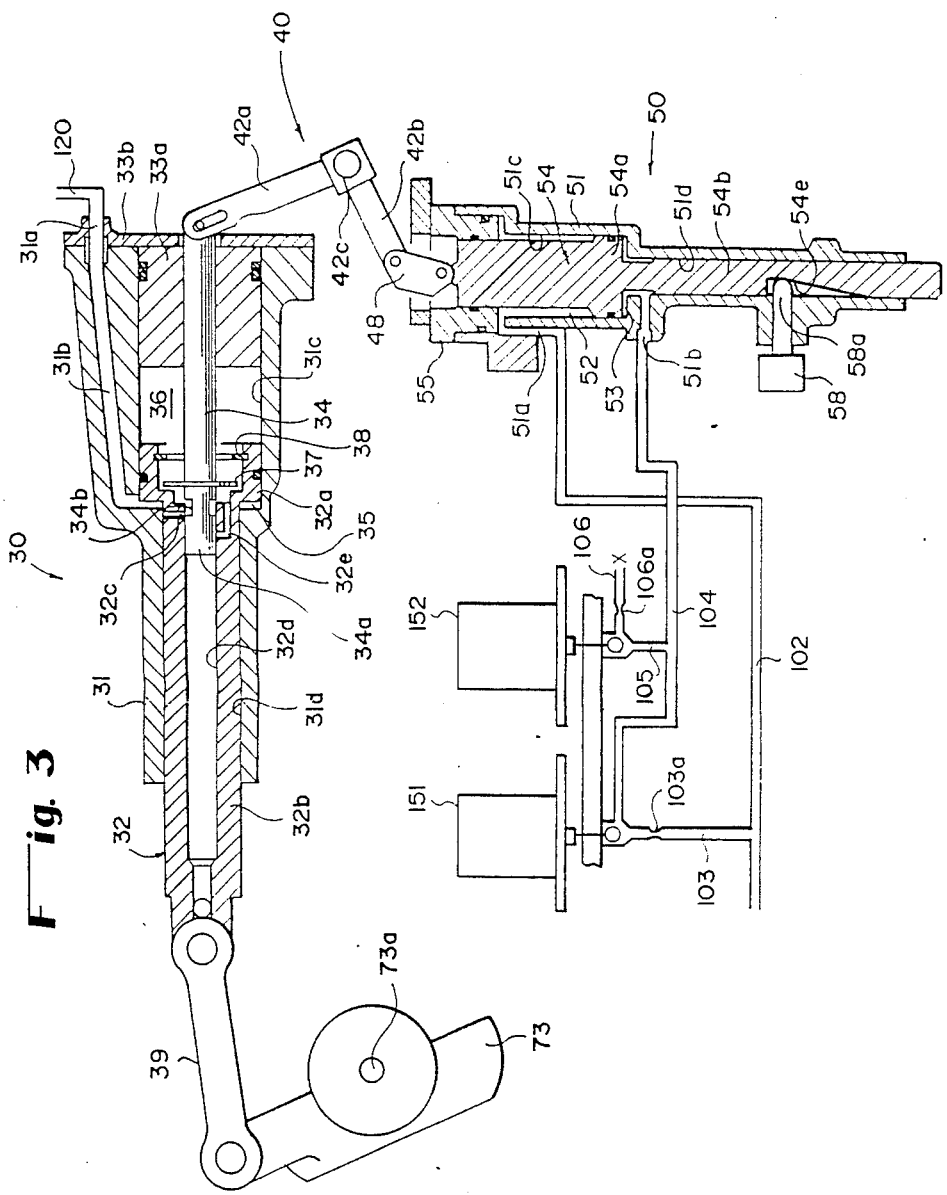
FIG. 3 shows cross-sectional views of first and second servo units used in the continuously variable speed transmission.

Tilt angle of the trunnion plate 73 is controlled by the first and second servo units 30, 50. The first servo unit 30 is placed on the upper portion of the case 5b. The first servo unit 30 is connected to the second servo unit 50 through the link mechanism 40. These valves 30, 50 are shown in FIG. 3 and the constructions and operations thereof are described hereinafter.

The first servo unit 30 comprises a housing 31 having a connection port 31a connected to the high pressure line 120, a piston member 32 slidably inserted into the housing 31, and a spool member 34 slidably and coaxially inserted into the piston member 32. High pressure oil in the closed hydraulic circuit of the transmission T is fed to the high pressure line 120 through the shuttle valve 4 and the fifth line Le. The piston member 32 consists of a piston portion 32a formed at its right end and a rod portion 32b coaxially extending leftward therefrom. The piston portion 32a is inserted into a cylinder hole 31c of the housing 31 and divides the space inside the cylinder hole 31c into two chambers defining two cylinder rooms 35, 36. The rod portion 32b, having a smaller diameter than the cylinder hole 31c, is inserted into a rod hole 31d which is concentric with the cylinder hole 31c. The right cylinder chamber 36 is covered by a plug member 33a and a cover 33b through which the right end of the spool member 34 protrudes.

The high pressure line 120 connected to the port 31a communicates with the left cylinder chamber 35 through a hydraulic line 31b. The piston member 32 is pushed rightward by the hydraulic pressure fed in the left cylinder chambers 35 through the high pressure line 120.

A land portion 34a which is inserted in a spool hole 32d is formed at the left end of the spool member 34. A pair of dents 34b having diagonal planes with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connects the right cylinder chamber 36 to the oil sump (not shown) through the spool hole 32d responding to the rightward motion of the spool member 34 and a connection passage 32c which can connect the left cylinder chamber 35 to the right cylinder room 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure is applied and therefore the piston member 32 is moved so as to follow the spool member 34.

When the spool member 34 is held still, the piston member 32 is also held still creating a hydraulic floating state because of pressure a balance between the left and right cylinder chambers 35, 36.

As discussed, when the spool member 34 is moved leftward or rightward, the piston member 32 is moved laterally so as to follow the spool member 34 with the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a and a end spool portion 54b coaxially extending downward therefrom. The piston portion 54a is inserted into a cylinder hole 51c of the housing 51 and divides the chamber inside the cylinder hole 51c covered by a cover 55 into two chambers defining an upper and a lower cylinder chamber 52 and 53, respectively. The end spool portion 54b is fitted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum or not, since the pushed-up spool 58a turns the switch 58 on.

Further, the hydraulic lines 102, 104 communicate with the upper and lower cylinder chambers 52, 53 through the ports 51a, 51b. The spool member 54 is moved up or down by the difference of hydraulic forces applied to the piston portion 54a which are determined based on the differences of hydraulic pressures and of the areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressures supplied through the hydraulic lines 102, 104 enables control of the motion of the spool member 34 and the piston member 32 in the first servo unit 30 and also enables control of the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

As shown in FIG. 1, hydraulic oil whose pressure is regulated by the charge pressure relief valve 12 is led to the hydraulic line 102 through a hydraulic line 101. Hydraulic oil in the hydraulic line 102 is led to the hydraulic line 104 through a hydraulic line 103 having an orifice 103a, and the hydraulic pressure in the hydraulic line 104 is controlled by the two solenoid valves 151, 152 which are operated based on duty cycle signals from the controller 100. Accordingly it is said that the signals from the controller 100 control the operations of the first and second servo units 30, 50 and consequently adjust the displacement of the hydraulic motor M.

Figure 4:
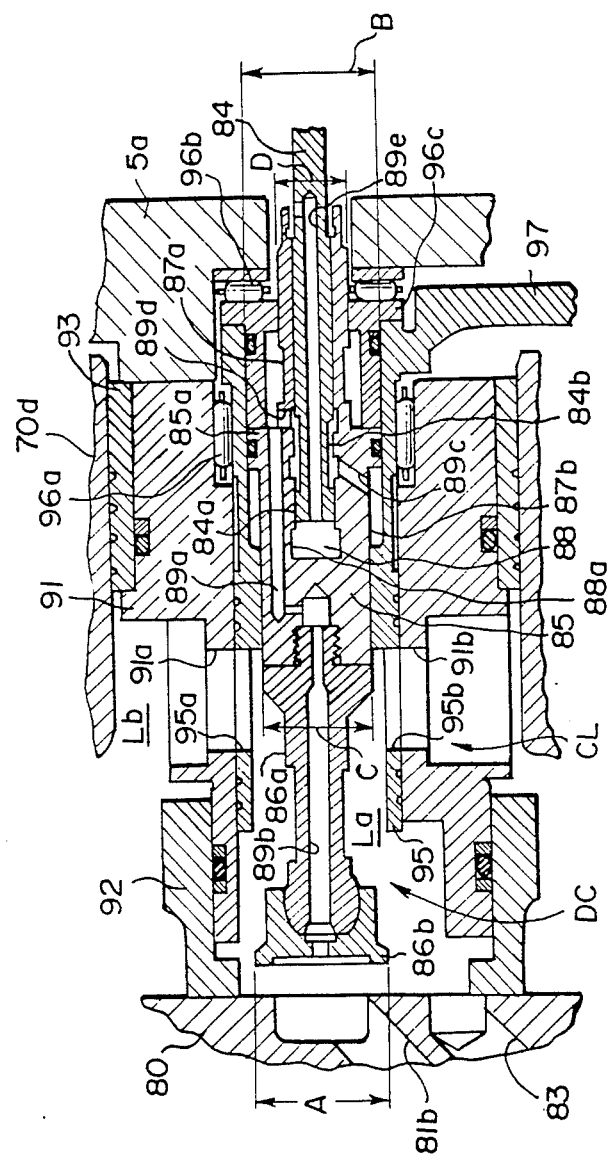
FIG. 4 is a cross-sectional view of the direct clutch device.

Referring now to the main clutch CL and the direct clutch DC shown in FIG. 4: The main clutch CL and the direct clutch DC are disposed inside the fixed shaft 91 which is inserted in the hollow space formed in the fourth section 70d of the motor cylinder 70.

A cylindrical bearing member 93 is mounted on the outside surface of the fixed shaft 91. The motor cylinder 70 is rotatably supported by the fixed shaft 91 with the bearing member 93.

Shortcut ports 91a, 91b through which the first line La can communicate with the second line Lb are bored through the circumferential wall of the fixed shaft 91. In the inner cylindrical space of the fixed shaft 91 is inserted a main clutch valve body 95 by which the shortcut ports 91a, 91b are opened or closed.

The main clutch valve body 95 is rotatably supported by the fixed shaft 91 with a radial needle bearing 96a and a thrust needle bearing 96b. Shortcut holes 95a, 95b which can be mated with the shortcut ports 91a, 91b are bored through the valve body 95. A rotator arm 97 is integrally connected to the right end of the valve body 95. In accordance with the rotation of the main clutch valve body 95 by the rotator arm 97, the shortcut holes 95a, 95b can be mated with the shortcut ports 91a, 91b. Accordingly, when the shortcut holes 95a, 95b are mated throughly with the shortcut ports 91a, 91b, the main clutch CL becomes OFF (disconnected) state. When the shortcut holes 95a, 95b are partially mated with the shortcut ports 91a, 91b, the main clutch CL becomes semi-ON (partially connected) state. When the shortcut holes 95a, 95b are in discord with the shortcut ports 91a, 91b, the main clutch CL becomes ON (connected) state. When the main clutch is in the OFF state, the oil fed in the first line La from the outlet port 81a of the pump is sent directly in the inlet port 82a of the pump through the shortcut ports 91a, 91b and the second line Lb. Therefore, the motor M is inoperative in spite of the operation of the pump P. When the main clutch CL is in the ON state, the oil is circulated in the closed hydraulic circuit and the power is transmitted from the pump P to the motor M. A means to rotate the rotator arm 97 for the ON-OFF actions of the main clutch CL is not described here since it is wellknown.

The direct clutch DC is disposed inside the main clutch valve body 95. A piston shaft 85 is slidably inserted in the cylindrical hole of the valve body 95. A valve rod 86a is screwed in the end of the piston shaft 85. A valve shoe 86b is swingably connected to the end of the valve rod 86a by means of a spherical joint.

When the piston shaft 85 is moved leftward, the left end of the valve shoe 86b comes in contact with the distribution plate 80 and closes the outlet port 81b of the pump P. While the exhaust port 81b is closed, the pump plungers 62 are hydraulically locked and the pump P is directly coupled with the motor M. Accordingly the motor cylinder 70 is mechanically driven by the pump cylinder 60 through the pump plungers 62 and the pump swash plate 63. The direct coupling of the pump P and the motor M is executed at the upright (top) position of the motor trunnion plate 73, wherein the speed reduction ratio is minimum. When the pump P and the motor M are directly coupled, the thrust force applied on the motor trunnion plate 73 by the motor plungers 72 and the friction between the swash plate 73b and the motor shoes 74 are decreased and consequently loads applied on each member such as bearings are lessened.

A hydraulic chamber 87a is formed between the right portion of the piston shaft 85 and the inner member 96c of the thrust needle bearing 96b which supports the valve body 95. The hydraulic chamber 87a normally communicates with the first line La through a line 89a and a line 89b, the line 89a being drilled in parallel with the axis of the piston shaft 85 and the line 89b being drilled through along the axis of the valve rod 86a so as to connect the line 89a to the first line La. During operation, the high pressure oil in the closed hydraulic circuit is always fed to the hydraulic chamber 87a.

The piston shaft 85 has a piston portion 85a in the middle thereof. A circular hydraulic chamber 87b is formed on the left side of the piston shaft 85 between the inner surface of the main clutch valve body 95 and the outer surface of the piston shaft 85. A center hole 88 extending along the central axis is formed on the right end of the piston shaft 85 and an escape groove 88a is formed on the bottom of the center hole 88. The center hole 88 can communicate with the circular hydraulic chamber 87b through a communicating hole 89c. The line 89a communicates with the center hole 88 through a communicating hole 89d.

A rod-shaped pilot valve 84 is inserted in the center hole 88. A land portion 84a which is fitted in the center hole 88 is formed on the end of the pilot valve 84. A groove portion 84b adjacent to the land portion 84a is also formed on the pilot valve 84. By a communicating hole 89e formed in the pilot valve 84, the center hole 88 communicates with the atmosphere. The pilot valve 84 is laterally moved by a link arm 46 (FIG. 5) connected thereto. The action of the link arm 46 is described later.

In the above construction of the direct clutch DC, the following areas,
the pressure applied area of the shoe 86b: A
the sectional area of the piston portion 85a: B the pressure applied area of the left part of the piston shaft 85: C the sectional area of the right part of the piston shaft 85: D are decided so as to satisfy the following inequalities.

A>(B−D)

(B−D)>C

When the pilot valve 84 is moved leftward, the communicating hole 89*d* is closed by the outer surface of the pilot valve 84. Accordingly the high pressure oil fed from the exhaust port 81*a* is directed to the hydraulic chamber 87*a* through the lines 89*a*, 89*b* and its hydraulic pressure is applied on the right side surface of the piston portion 85*a*. This hydraulic pressure is also applied on the left part of the piston shaft 85. Since the pressure applied area of the right side surface of the piston portion 85*a* is (B−D) and the pressure applied area of the left part of the piston shaft 85 is C, the piston shaft 85 is moved leftward in accordance with the inequality (B−D)>C. When the piston shaft 85 is moved leftward, the shoe 86*b* comes in contact with the distribution plate 80 and closes the exhaust line 81*b* causing a direct connecting state of the pump P and the motor M.

At this direct connecting state, the high pressure oil (whose pressure is the same as that in the hydraulic chamber 87*a*) from the exhausting port 81*a* is applied on the end surface of the shoe 86*b* having a pressure applied area of A. The high pressure oil in the hydraulic room 87*a* is applied on the left surface of the piston portion 85*a* having a pressure applied area of (B−D). Accordingly, the shoe 86*b* is pushed rightward in accordance with the inequality A>(B−D). However, if the shoe 86 is moved rightward even slightly, the shoe is moved back immediately, because the hydraulic force applied on the end surface of the shoe 86*b* is released as soon as the shoe 86*b* is moved rightward.

Therefore, the shoe 86*b* is kept in a so-called hydraulic floating state, and the leakage through a clearance between the shoe 86*a* and the exhaust line 81*b* is minimized.

When the pilot valve 84 is move rightward, the groove portion 84*b* of the pilot valve 84 communicates with the communicating hole 89*d*. Therefore the high pressure oil is applied not only on the right side surface of the piston portion 85*a* and the left part of the piston shaft 85 but on the left side surface of the piston portion 85*a* since the oil is fed to the chamber 87*b* through the hole 89*d*, the groove portion 84*b* and the line 89*c*. Since the pressure applied area for giving leftward force to the piston shaft 85 is (B−D) and that for giving rightward force to it is B, the piston shaft is moved rightward in accordance with an inequality B>(B−D). Consequently, the direct connection of the pump P and the motor M is canceled. Thus, the ON-OFF actions of the direct clutch DC are controlled by the lateral movement of the piston shaft 85 which follows the pilot valve 84.

The lateral movement of the pilot valve 84 is controlled by the second servo unit 50 which is connected to the pilot valve 84 through the link mechanism 40. The construction and the action of the link mechanism 40 are described hereinafter.

As illustrated in FIG. 5, the link mechanism 40 includes a first shaft 42*c* having two arms 42*a*, 42*b* and a second shaft 45 placed under and in parallel with the first shaft 42*c*, the both shafts 42*c*, 45 being rotatably supported by the bearings 49*a*, 49*b* and 49*c*. The first and the second servo units 30, 50 are linked by means of the link arms 42*a*, 42*b*, the arm 42*a* being connected to the spool member 34 of the first servo unit 30 and the arm 42*b* being connected to the spool member 54 of the second servo unit 50 through the second link member 48.

The link arm 46 which is connected to the pilot valve 84 of the direct clutch DC is firmly mounted on the second shaft 45. When the link arm 46 is swung corresponding to the rotation of the second shaft 45, the link arm 46 moves the pilot valve 84 laterally. Consequently the ON-OFF action of the direct clutch DC is controlled by the pilot valve 84. The link arm 46 is always being pushed by a torsion coil spring 46*a* mounted on the second shaft 45 so as to pull the pilot valve 84 out.

A drive cam 43 and a driven cam 44 which are in contact, with each other, are fixed on the first and the second shafts 42*c* 45 respectively. By the actions of these cams 43, 44, the second shaft 45 is rotated as the first shaft is rotated.

Figure 6A:
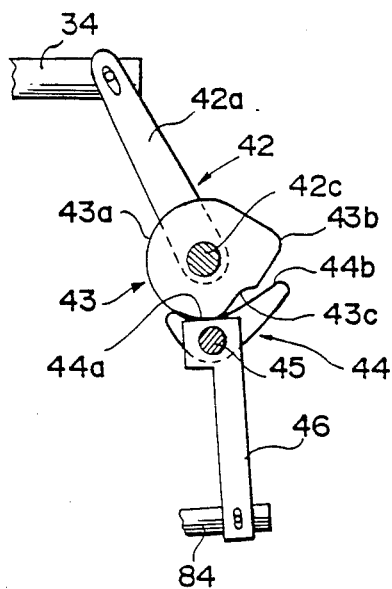
FIGS. 6B to 6C are front views showing the actuation of a cam composing the link mechanism.
Figure 6B:
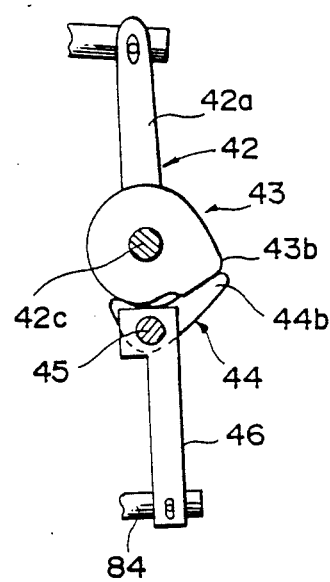
Figure 6C:
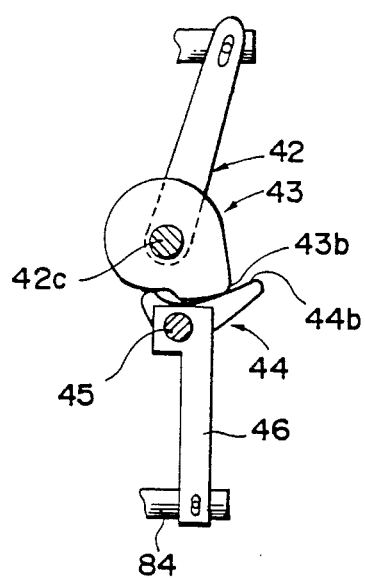

The actions of the cams 43, 44 are described here referring FIGS. 6A–6C. As shown in these drawings, the drive cam 43 comprises a semicircular portion 43*a* which is concentric with the first shaft 42*c*, a convex portion 43*b* which projects out of the periphery of the semicircular portion 43*a* and a concave portion 43*c* which is indented below the periphery of the semicircular portion 43*a*. The driven cam 44 comprises an concaved arc portion 44*a* having almost the same curvature as that of the semicircular portion 43*a* and a linear portion 44*b* extending along the tangential line of the arc portion 44*a*.

When the spool member 54 of the second servo unit 50 is at a bottom position and the inclination angle of the trunnion plate 73 of the motor M is maximum (the speed reduction ratio is also maximum), the semicircular portion 43*a* of the drive cam 43 is in contact with the concaved arc portion 44*a* of the driven cam 44 and the convex portion 43*b* is apart from the linear portion 44*b* as shown in FIG. 6A. Accordingly, the pilot valve 84 is moved right by the force of the torsion coil spring 46*a* transmitted through the link arm 46 and the direct clutch DC is fully opened.

Then, when the spool member 54 is moved up to decrease the inclination angle of the trunnion plate 73, the first shaft 42*c* is rotated clockwise and therefore the trunnion plate 73 is also rotated clockwise around the trunnion axis 73*a* by the first servo unit 30. Consequently the inclination angle of the trunnion plate 73 and the speed reduction ratio are decreased. At this time, the drive cam 43 is rotated as the first shaft 42*c* is rotated. However, the driven cam 44 is not rotated until the convex portion 43*b* comes in contact with the linear portion 44*b*. Therefore the pilot valve 84 remains still and the direct clutch DC is kept open.

When the spool member 54 of the second servo unit 50 is further moved up until the speed reduction ratio becomes "1" (minimum) (the motor trunnion plate being perpendicular to the motor axis), the convex portion 43*b* of the drive cam 43 which has been rotated clockwise with the first shaft 42*c* comes in contact with the linear portion 44*b* of the driven cam 44 as shown in FIG. 6B. It can be found by a top position detecting switch 58 that the motor trunnion plate 73 has become perpendicular to the motor axis and the speed reduction ratio has become "1".

When the spool member 54 is further moved up, the first shaft 42c is further rotated clockwise. The spool member 34 of the first servo unit 30 is pushed rightward, but the motor trunnion plate 73 is kept still, already being perpendicular to the motor axis. In the mean time, since the drive cam 43 is rotated clockwise with the first shaft 42c, the linear portion 44b is pushed by the convex portion 43b as shown in FIG. 6c and consequently the driven cam 44 is rotated clockwise.

The second shaft 45 and the link arm 46 are also rotated clockwise in accordance with the rotation of the driven cam 44 against the torsion coil spring 46a. Accordingly the pilot valve 84 is pushed leftward. Then the piston shaft 85 is also moved leftward and the direct connecting state (the ON-state of the direct clutch valve DC) is created since the shoe 86b blocks the exhaust line 81b.

Then, if the spool member 54 of the second servo unit 50 is moved downward, it performs actuation reverse to the above-described actuation whereby the inclination angle of the motor trunnion plate 73 is increased to increase the speed reduction ratio after a direct clutch valve has been switched OFF.

Methods for controlling the operation of the main clutch valve CL and the direct clutch valve DC and for controlling the inclination of the motor trunnion plate 73 of the continuously variable speed transmission in the above structured are described below.

Figure 7:
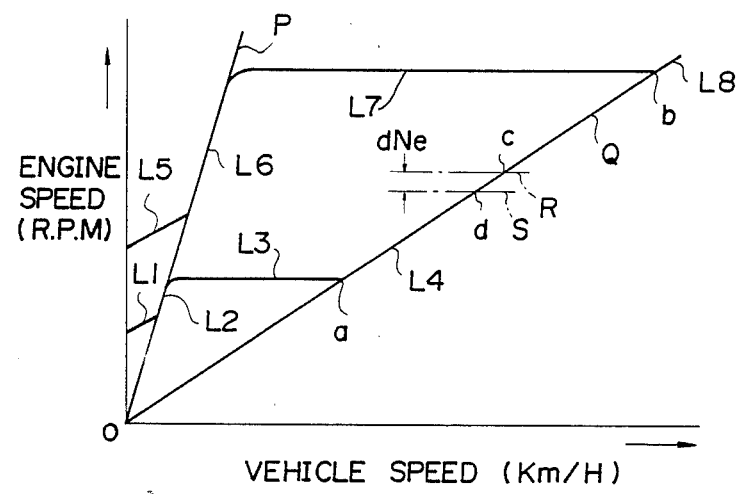
FIG. 7 is a graph showing the traveling characteristics of a vehicle with the continuously variable speed transmission according to a first embodiment.

FIG. 7 is a graph showing a relationship between the engine speed and the vehicle speed in a vehicle on which the continuously variable speed transmission is mounted. In the graph, straight lines P and Q shows the characteristics at the maximum and minimum speed reduction ratios respectively. When the vehicle speed is zero and the engine is in an idling state, the main clutch CL is OFF with the speed reduction ratio being maximum and the direct clutch DC is also OFF. When an accelerator pedal is depressed to increase the throttle opening thereby increasing the engine speed, the vehicle speed is increased controlling the speed reduction ratio so that the engine speed coincides with the reference engine speed corresponding to the accelerator opening. In the control, for instance, the vehicle speed varies in the order of $L_1$ (engagement of the main clutch) to $L_2$ (increase of the vehicle speed with increase of the engine speed at the maximum speed reduction ratio) to $L_3$ (increase of the vehicle speed by decreasing the speed reduction ratio while keeping the engine speed constant) to $L_4$ and $L_8$ (increase of the vehicle speed with increase of the engine speed at the minimum speed reduction ratio). At a transition point from the state $L_3$ to the state $L_4$ (point "a"), the direct clutch valve DC is switched from OFF to ON. The traveling characteristics along the lines $L_1$ to $L_4$ shown herein varies with the degree of depression of the accelerator pedal. For example, when the depression of the accelerator pedal is great and fast, connection control of the main clutch and speed reduction control of the transmission are conducted at a high engine speed, for example, along the lines $L_5$, $L_6$, $L_7$ and $L_8$ in the graph.

Figure 8:
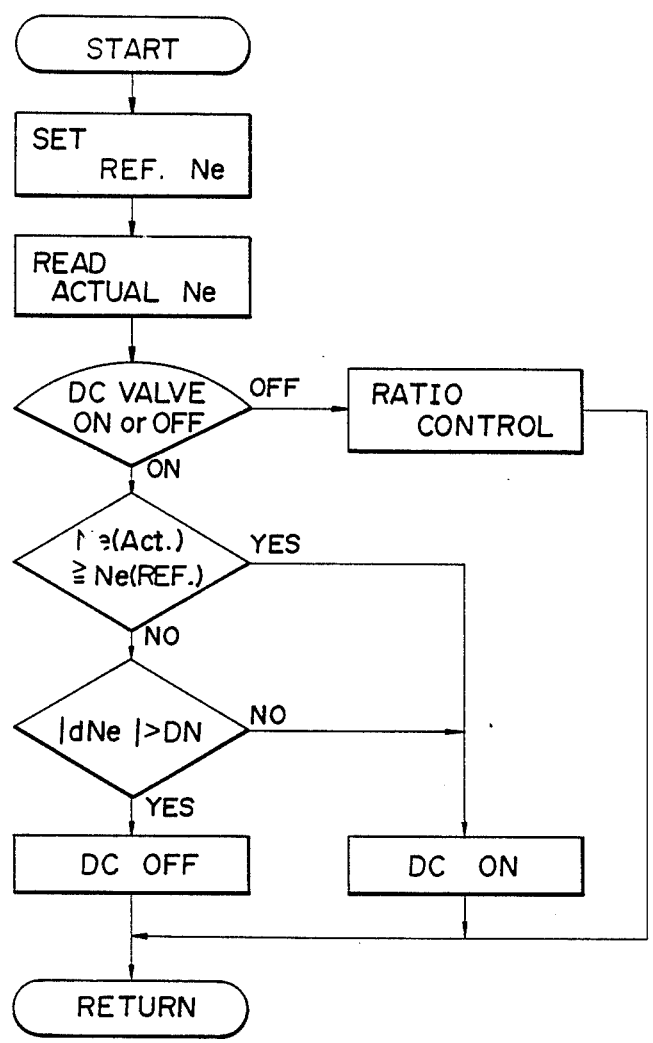
FIG. 8 is a flowchart showing the OFF-control of the direct clutch valve according to the first embodiment.

A flowchart in FIG. 8 explains a method of controlling the direct clutch valve DC to switch OFF after it is switched ON. In the control, a direct clutch disconnecting reference engine speed (for example, the engine speed shown in the chain line R in FIG. 7) corresponding to the accelerator opening (the opening of the engine throttle or that of the accelerator pedal) is set. Then the actual engine speed is read-in to determine whether the direct clutch valve is being switched ON or OFF. When the direct clutch valve DC is yet being switched OFF, the normal speed reduction control is performed so that the actual engine speed coincides with the reference engine speed according to the accelerator opening.

Figure 9:
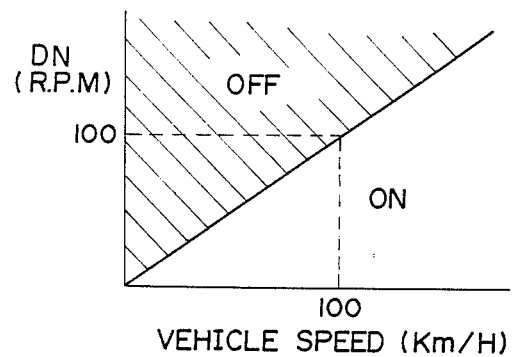
FIG. 9 is a graph showing a relationship between the vehicle speed and the engine speed difference dNe for the above OFF-control.

When the clutch valve DC is being switched ON, the actual engine speed is compared with the direct clutch disconnecting reference engine speed. If the actual engine speed is higher than the reference engine speed, the direct clutch valve DC is kept being switched ON. If the later is higher than the former, a decision is made whether or not absolute value dNe of the difference between the actual engine speed and the reference engine speed is larger than the predetermined speed difference DN. The predetermined speed difference DN corresponds, as shown in FIG. 9, to the speed difference previously set against the vehicle speed (for example, the predetermined speed difference dNe for 100 km/H of the vehicle speed is 100 rpm with reference to the graph). The predetermined speed difference DN is set in view of the fact that the increment of engine speed when the direct clutch valve DC is switched from OFF to ON varies nearly corresponding to the vehicle speed. Also, the difference DN is set somewhat larger than the increment of the engine speed at each vehicle speed in the case of ON-OFF switching of the direct clutch valve.

The direct clutch valve DC is kept switched ON when the absolute value dNe of the difference between the reference engine speed and the actual engine speed is smaller than the predetermined engine speed difference DN (in the ON region in FIG. 9), whereas the direct clutch valve DC is switched OFF when the difference between the reference engine speed and the actual engine speed is larger than the predetermined engine speed difference DN (in the shaded OFF region in FIG. 9). In other words, the direct clutch DC is switched from ON to OFF when the engine speed is decreased along the straight line Q ($L_4$ and $L_8$) in FIG. 7, to a speed corresponding to the point d at which the line Q crosses the line S. At the point d, the engine speed is lower than the reference engine speed R by the predetermined speed difference DN.

In this case, the control is so conducted that the engine speed coincides with the reference engine speed. The direct clutch is switched from OFF to ON when the speed reduction ratio has become "1". Then it is switched from ON to OFF when a drop of the actual engine speed from the direct clutch disconnecting reference engine speed is bigger than the predetermined speed difference DN corresponding to the vehicle speed. The predetermined speed difference DN corresponds to the increment of the engine speed produced at the switching of the direct clutch from ON to OFF and the increment is set corresponding to the vehicle speed because it nearly varies with the vehicle speed. Therefore, the increased engine speed never exceeds the reference engine speed and no hunting phenomenon is produced even if the engine speed is increased at the switching of the direct clutch from ON to OFF.

Figure 11:
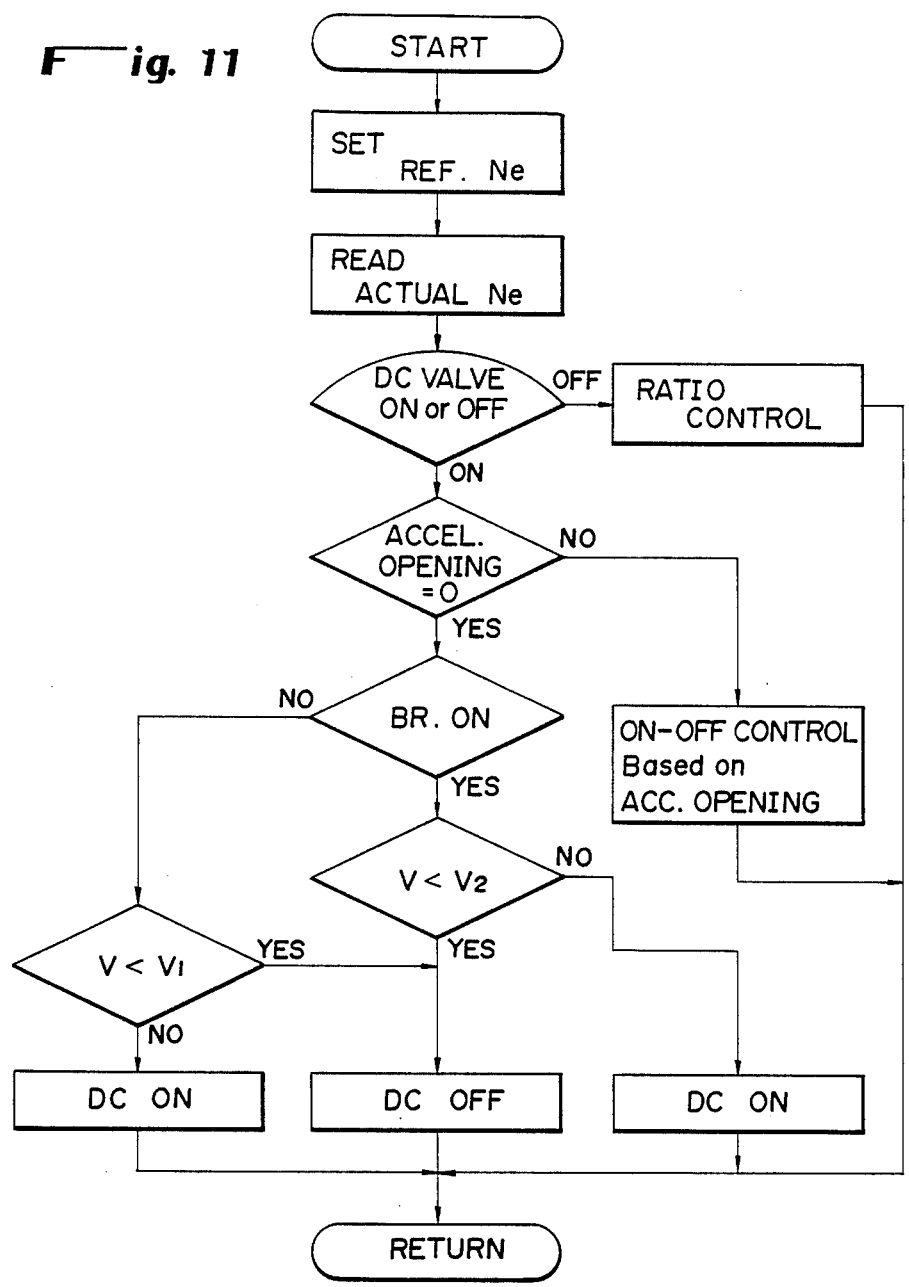
FIG. 11 is a flowchart showing the OFF-control of the direct clutch valve according to the second embodiment.

A control of ON-OFF switching of the direct clutch valve DC in accordance with the accelerator opening is described above. Next, a control method of switching the direct clutch valve DC from ON to OFF when the accelerator opening is closed is described below with reference to the flowchart in FIG. 11 as a second embodiment. In this control, the reference engine speed is set according to the accelerator opening and then the actual engine speed is read. Then it is decided whether the direct clutch valve DC is being switched ON or OFF. When the direct clutch valve is being switched OFF, a normal speed reduction control is conducted such that the actual engine speed is in agreement with the reference engine speed corresponding to the accelerator opening.

On the other hand, when the direct clutch valve DC is switched ON, it is detected whether or not the accelerator opening is zero (whether or not the accelerator pedal is depressed) based on an accelerator opening signal $\theta$acc. When the depression of the accelerator pedal is detected, the control as shown in FIG. 8 is conducted. Namely, the ON/OFF operation of the direct clutch valve DC is controlled based on the direct clutch disconnecting reference engine speed which is set according to the accelerator opening.

If the accelerator opening is zero, whether or not the vehicle brake is actuated is then decided. If the vehicle speed is reduced without actuation of the brakes, it is decided whether or not the actual vehicle speed is lower than a first predetermined vehicle speed $V_1$ set for unactuated braking. The direct clutch valve DC is kept being switched ON when the actual vehicle speed is higher than the first predetermined vehicle speed $V_1$ and is switched OFF when the actual vehicle speed is lower than the first predetermined vehicle speed $V_1$. On the other hand, when the brakes are applied to reduce the vehicle speed, the actual vehicle speed is compared with a second predetermined vehicle speed $V_2$ set for brake actuation which is higher than the first predetermined vehicle speed $V_1$. In this case, the direct clutch valve DC is kept being switched ON when the actual vehicle speed is higher than the second predetermined vehicle speed $V_2$; whereas the direct clutch valve DC is switched OFF when the former speed is lower than the latter speed.

Figure 10:
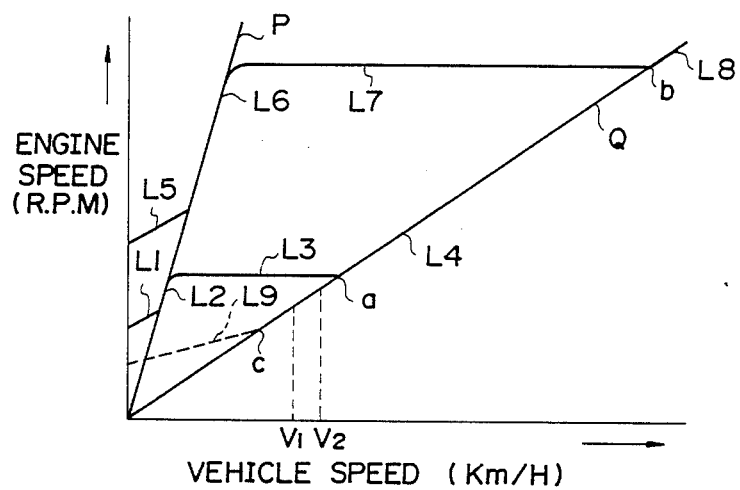
FIG. 10 is a graph showing the traveling characteristics of a vehicle with the continuously variable transmission according to a second embodiment.

If the direct clutch valve DC is controlled in the above way, when the brakes are applied under a running condition with the direct clutch valve DC being switched ON, the reference engine speed is lowered since the depression of the accelerator pedal is released to depress the brake pedal. The vehicle speed is reduced along the lines $L_8$ and $L_4$ on which the speed reduction ratio is minimum in FIG. 10 with the direct clutch valve DC being switched ON. When the vehicle speed attains to the second vehicle speed $V_2$, a driving signal is fed from a controller 100 to the solenoid valves 151 and 152, and the spool member 54 of the second servo valve 50 is descended to switch the direct clutch DC OFF.

When the depression of the accelerator pedal is lessened to reduce the vehicle speed without applying the brakes, the throttle opening is reduced to lower the reference engine speed, and therefore the vehicle speed is reduced along the lines $L_8$ and $L_4$ on which the speed reduction ratio is minimum. However, when the vehicle speed reaches the first vehicle speed $V_1$, which is lower than the second vehicle speed $V_2$, the direct clutch valve DC is switched OFF. When the vehicle speed has reached to a predetermined value (the vehicle speed at a point c in the drawing in FIG. 10), the clutch valve CL is opened to interrupt the power transmission from the engine to the wheels. Accordingly, the vehicle speed is reduced with the rotation of the engine being kept in a idling state to prevent the engine from stalling.

The ON/OFF control of the direct clutch valve is controlled by deciding whether or not the vehicle speed is less than the predetermined vehicle speeds $V_1$ and $V_2$ in the above case. The vehicle speed is proportional to the engine speed because the speed reduction ratio remains minimum. Accordingly, the ON/OFF control of the direct clutch valve can be conducted based on the engine speed instead of the vehicle speed.

In the above-described control, the direct clutch valve is switched from ON to OFF at a higher speed when the vehicle is decelerated with the brakes being applied, than when it is decelerated without braking. Accordingly, the direct clutch valve is switched OFF at an earlier stage if the brakes are applied, so that the rapid drop of the engine speed at aggressive braking which may cause engine stall can be avoided. In addition, when the vehicle is decelerated without braking, the vehicle speed for switching the direct clutch valve OFF can be set at a low level, whereby the engine speed can be lowered early at the deceleration of the vehicle to decrease the fuel consumption and the vibration level during traveling.

Although in the above embodiments, the device for controlling the angle of the motor trunnion plate is connected to the direct clutch device by a link mechanism, a link mechanism of another structure may be used or the direct clutch device may, of course, be controlled independently.

Also, the above embodiments are described about a continuously variable speed transmission in which the input shaft 1 is connected to the pump cylinder 60 and the supporting portion 70a of the pump swash plate 63 is coupled with the motor cylinder 70 which is arranged on the outer periphery of the pump cylinder 60. However, the present invention is not limited to the direct clutch device in the above continuously variable speed transmission. For example, a clutch device in the present invention may be used for a continuously variable speed transmission in which a pump cylinder and a motor cylinder are horizontally arranged. In addition the direct clutch device may be used for another type continuously variable speed transmission wherein; the angle of the swash plate of the pump is variable, the motor is of a constant displacement type, the input shaft is connected to the pump cylinder, the pump cylinder is connected to the supporting member of the motor swash plate, and the motor cylinder is connected to the output shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic continuously variable speed transmission with a direct clutch valve comprising:
   a hydraulic pump connected to an engine in a vehicle;
   a hydraulic motor connected to an output shaft;
   a hydraulic closed circuit for hydraulically connecting said hydraulic pump and said hydraulic motor;
   a direct clutch valve placed in said closed circuit to block said closed circuit;
   a speed reduction ratio control actuator for varying displacements of at least one of said hydraulic pump and said hydraulic motor to control speed reduction ratio; and
   a direct clutch valve controlling device for controlling operations of said direct clutch valve to block the closed circuit when the speed reduction ratio becomes substantially "1" in accordance with the actuation of said speed reduction ratio control actuator;

wherein, said direct clutch valve controlling device maintains direct connecting state in which said closed circuit is being blocked by said direct clutch valve when an actual engine speed is higher than a direct clutch disconnecting reference engine speed set in accordance with a parameter indicating driver's intention of acceleration, and then said direct clutch valve control device releases the blocking of the closed circuit by said direct clutch valve when a drop of the actual engine speed from the direct clutch disconnecting reference engine speed exceeds a predetermined amount corresponding to a vehicle speed of said vehicle.

2. A hydraulic continuously variable speed transmission as defined in claim 1, wherein said parameter representing driver's intention of acceleration is determined based on an accelerator opening.

3. A hydraulic continuously variable speed transmission with a direct clutch valve comprising:

a hydraulic pump connected to an engine in a vehicle;
a hydraulic motor connected to an output shaft;
a hydraulic closed circuit for hydraulically connecting said hydraulic pump and said hydraulic motor;
a direct clutch valve placed in said closed circuit to block said closed circuit;
a speed reduction ratio control actuator for varying displacements of at least one of said hydraulic pump and said hydraulic motor to control speed reduction ratio; and
a direct clutch valve controlling device for controlling operations of said direct clutch valve to block the closed circuit when the speed reduction ratio becomes substantially "1" in accordance with the actuation of said speed reduction ratio control actuator;

wherein, said direct clutch valve controlling device maintains direct connecting state in which said closed circuit is being blocked by said direct clutch valve when an actual engine speed is higher than a direct clutch disconnecting reference engine speed set in accordance with a parameter indicating driver's intention of acceleration, and then said direct clutch valve control device releases the blocking of the closed circuit by said direct clutch valve when a drop of the actual engine speed from the direct clutch disconnecting reference engine speed exceeds a predetermined amount corresponding to a vehicle speed of said vehicle;

wherein said hydraulic pump is a constant displacement swash plate type axial plunger hydraulic pump, and said hydraulic motor being a variable displacement swash plate type axial plunger motor;

a cylinder member of said hydraulic pump being connected to said engine and a motor cylinder member of said hydraulic motor being connected to said output shaft; and a swash plate of said hydraulic pump being supported by a portion of said cylinder member of said hydraulic motor.

4. A hydraulic continuously variable speed transmission comprising:

a hydraulic pump connected to an engine in a vehicle;
a hydraulic motor connected to an output shaft;
a hydraulic closed circuit for hydraulically connecting the hydraulic pump and the hydraulic motor;
a direct clutch valve placed in said closed circuit to block said closed circuit;
a speed reduction ratio control actuator for varying displacements of at least one of said hydraulic pump and said hydraulic motor to control speed reduction ratio;
a direct clutch valve controlling device for controlling said direct clutch valve to block the closed circuit when the speed reduction ratio becomes substantially "1" in accordance with actuation of the speed reduction ratio control actuator; and
accelerator opening detection means for detecting an accelerator opening which indicates driver's intention of acceleration;

wherein, said direct clutch valve controlling device releases the blocking of the closed circuit by said direct clutch valve when the accelerator opening detected by said accelerator opening detection means is substantially fully closed during running with said direct clutch valve blocking the closed circuit.

5. A hydraulic continuously variable speed transmission as defined in claim 4, further comprising vehicle speed detection means for detecting a vehicle speed of said vehicle, wherein, said direct clutch valve controlling device releases the blocking of the closed circuit by said direct clutch valve when the vehicle speed detected by said vehicle speed detection means is less than a predetermined vehicle speed and also when the accelerator opening detected by said accelerator opening detection means is substantially fully closed during running with said direct clutch valve blocking the closed circuit.

6. A hydraulic continuously variable speed transmission comprising:

a hydraulic pump connected to an engine in a vehicle;
a hydraulic motor connected to an output shaft;
a hydraulic closed circuit for hydraulically connecting the hydraulic pump and the hydraulic motor;
a direct clutch valve placed in said closed circuit to block said closed circuit;
a speed reduction ratio control actuator for varying displacements of at least one of said hydraulic pump and said hydraulic motor to control speed reduction ratio;
a direct clutch valve controlling device for controlling said direct clutch valve to block the closed circuit when the speed reduction ratio becomes substantially "1" in accordance with actuation of the speed reduction ratio control actuator; and
accelerator opening detection means for detecting an accelerator opening which indicates driver's intention of acceleration;

wherein, said direct clutch valve controlling device releases the blocking of the closed circuit by said direct clutch valve when the accelerator opening detected by said accelerator opening detection means is substantially fully closed during running with said direct clutch valve blocking the closed circuit;

further comprising vehicle speed detection means for detecting a vehicle speed of said vehicle, wherein, said direct clutch valve controlling device releases the blocking of the closed circuit by said direct clutch valve when the vehicle speed detected by said vehicle speed detection means is less than a predetermined vehicle speed and also when the accelerator opening detected by said accelerator opening detection means is substantially fully closed during running with said direct clutch valve blocking the closed circuit;

wherein brake actuation detection means for detecting actuation of vehicle brakes is provided, and said predetermined speed is set higher in a case where the brake actuation detection means detects the actuation of the brakes than in a case where the brakes are unactuated.

7. A hydraulic continuously variable speed transmission comprising:
   a hydraulic pump connected to an engine in a vehicle;
   a hydraulic motor connected to an output shaft;
   a hydraulic closed circuit for hydraulically connecting the hydraulic pump and the hydraulic motor;
   a direct clutch valve placed in said closed circuit to block said closed circuit;
   a speed reduction ratio control actuator for varying displacements of at least one of said hydraulic pump and said hydraulic motor to control speed reduction ratio;
   a direct clutch valve controlling device for controlling said direct clutch valve to block the closed circuit when the speed reduction ratio becomes substantially "1" in accordance with actuation of the speed reduction ratio control actuator; and
   accelerator opening detection means for detecting an accelerator opening which indicates driver's intention of acceleration;
   wherein, said direct clutch valve controlling device releases the blocking of the closed circuit by said direct clutch valve when the accelerator opening detected by said accelerator opening detection means is substantially fully closed during running with said direct clutch valve blocking the closed circuit;
   wherein said hydraulic pump is a constant displacement swash plate type axial plunger hydraulic pump and said hydraulic motor is a variable displacement swash plate type axial plunger pump;
   a cylinder member of said hydraulic pump being connected to said engine, a cylinder member of said hydraulic motor being connected to said output shaft, and
   a swash plate of said hydraulic pump being supported by said cylinder member of said hydraulic motor.

8. A hydraulic continuously variable speed transmission comprising:
   a hydraulic pump connected to an engine;
   a hydraulic motor connected to an output shaft;
   a hydraulic closed circuit for hydraulically connecting the hydraulic pump and the hydraulic motor;
   a direct clutch valve placed in said closed circuit to block said closed circuit;
   a speed reduction ratio control actuator for varying displacements of at least one of said hydraulic pump and said hydraulic motor to control speed reduction ratio;
   a direct clutch valve controlling device for controlling said direct clutch valve to block the closed circuit when the speed reduction ratio becomes substantially "1" in accordance with the actuation of the speed reduction ratio control actuator;
   accelerator opening detection means for detecting an accelerator opening which indicates driver's intention of acceleration; and
   engine speed detection means for detecting engine speed;
   wherein, said direct clutch valve controlling device releases the blocking of the closed circuit by said direct clutch valve when the engine speed detected by said engine speed detection means is less than a predetermined engine speed and also when the accelerator opening detected by said accelerator opening detection means is substantially fully closed during running with said direct clutch valve blocking the closed circuit.

9. A hydraulic continuously variable speed transmission comprising:
   a hydraulic pump connected to an engine;
   a hydraulic motor connected to an output shaft;
   a hydraulic closed circuit for hydraulically connecting the hydraulic pump and the hydraulic motor;
   a direct clutch valve placed in said closed circuit to block said closed circuit;
   a speed reduction ratio control actuator for varying displacements of at least one of said hydraulic pump and said hydraulic motor to control speed reduction ratio;
   a direct clutch valve controlling device for controlling said direct clutch valve to block the closed circuit when the speed reduction ratio becomes substantially "1" in accordance with the actuation of the speed reduction ratio control actuator;
   accelerator opening detection means for detecting an accelerator opening which indicates driver's intention of acceleration; and
   engine speed detection means for detecting engine speed;
   wherein, said direct clutch valve controlling device releases the blocking of the closed circuit by said direct clutch valve when the engine speed detected by said engine speed detection means is less than a predetermined engine speed and also when the accelerator opening detected by said accelerator opening detection means is substantially fully closed during running with said direct clutch valve blocking the closed circuit;
   wherein brake actuation detection means for detecting actuation of vehicle brakes is provided, and said predetermined speed is set higher in a case where the brake actuation detection means detects the actuation of the brakes than in a case where the brakes are unactuated.

10. A hydraulic continuously variable speed transmission comprising:
    a hydraulic pump connected to an engine;
    a hydraulic motor connected to an output shaft;
    a hydraulic closed circuit for hydraulically connecting the hydraulic pump and the hydraulic motor;
    a direct clutch valve placed in said closed circuit to block said closed circuit;
    a speed reduction ratio control actuator for varying displacements of at least one of said hydraulic pump and said hydraulic motor to control speed reduction ratio;
    a direct clutch valve controlling device for controlling said direct clutch valve to block the closed circuit when the speed reduction ratio becomes substantially "1" in accordance with the actuation of the speed reduction ratio control actuator;

accelerator opening detection means for detecting an accelerator opening which indicates driver's intention of acceleration; and engine speed detection means for detecting engine speed;

wherein, said direct clutch valve controlling device releases the blocking of the closed circuit by said direct clutch valve when the engine speed detected by said engine speed detection means is less than a predetermined engine speed and also when the accelerator opening detected by said accelerator opening detection means is substantially fully closed during running with said direct clutch valve blocking the closed circuit;

wherein said hydraulic pump is a constant displacement swash plate type axial plunger hydraulic pump and said hydraulic motor is a variable displacement swash plate type axial plunger pump;

a cylinder member of said hydraulic pump being connected to said engine, a cylinder member of said hydraulic motor being connected to said output shaft; and a swash plate of said hydraulic pump being supported by a portion of said cylinder member of said hydraulic motor.

11. A hydraulic continuously variable speed transmission comprising:

a hydraulic pump connected to an engine in a vehicle;

a hydraulic motor connected to an output shaft;

a hydraulic closed circuit for hydraulically connecting the hydraulic pump and the hydraulic motor;

a direct clutch valve placed in said closed circuit to block said closed circuit;

a speed reduction ratio control actuator for varying displacements of at least one of said hydraulic pump and said hydraulic motor to control speed reduction ratio;

a direct clutch valve controlling device for controlling said direct clutch valve to block the closed circuit when the speed reduction ratio becomes substantially "1" in accordance with actuation of the speed reduction ratio control actuator; and accelerator opening detection means for detecting an accelerator opening which indicates driver's intention of acceleration;

wherein, said direct clutch valve controlling device releases the blocking of the closed circuit by said direct clutch valve when the accelerator opening detected by said accelerator opening detection means is substantially fully closed during running with said direct clutch valve blocking the closed circuit;

further comprising vehicle speed detection means for detecting a vehicle speed of said vehicle, wherein, said direct clutch valve controlling device releases the blocking of the closed circuit by said direct clutch valve when the vehicle speed detected by said vehicle speed detection means is less than a predetermined vehicle speed and also when the accelerator opening detected by said accelerator opening detection means is substantially fully closed during running with said direct clutch valve blocking the closed circuit;

wherein said hydraulic pump is a constant displacement swash plate type axial plunger hydraulic pump and said hydraulic motor is a variable displacement swash plate type axial plunger pump;

a cylinder member of said hydraulic pump being connected to said engine, a cylinder member of said hydraulic motor being connected to said output shaft, and a swash plate of said hydraulic pump being supported by said cylinder member of said hydraulic motor.

12. A hydraulic continuously variable speed transmission comprising:

a hydraulic pump connected to an engine in a vehicle;

a hydraulic motor connected to an output shaft;

a hydraulic closed circuit for hydraulically connecting the hydraulic pump and the hydraulic motor;

a direct clutch valve placed in said closed circuit to block said closed circuit;

a speed reduction ratio control actuator for varying displacements of at least one of said hydraulic pump and said hydraulic motor to control speed reduction ratio;

a direct clutch valve controlling device for controlling said direct clutch valve to block the closed circuit when the speed reduction ratio becomes substantially "1" in accordance with actuation of the speed reduction ratio control actuator; and accelerator opening detection means for detecting an accelerator opening which indicates driver's intention of acceleration;

wherein, said direct clutch valve controlling device releases the blocking of the closed circuit by said direct clutch valve when the accelerator opening detected by said accelerator opening detection means is substantially fully closed during running with said direct clutch valve blocking the closed circuit;

further comprising vehicle speed detection means for detecting a vehicle speed of said vehicle, wherein, said direct clutch valve controlling device releases the blocking of the closed circuit by said direct clutch valve when the vehicle speed detected by said vehicle speed detection means is less than a predetermined vehicle speed and also when the accelerator opening detected by said accelerator opening detection means is substantially fully closed during running with said direct clutch valve blocking the closed circuit;

wherein brake actuation detection means for detecting actuation of vehicle brakes is provided, and said predetermined speed is set higher in a case where the brake actuation detection means detects the actuation of the brakes than in a case where the brakes are unactuated;

wherein said hydraulic pump is a constant displacement swash plate type axial plunger hydraulic pump and said hydraulic motor is a variable displacement swash plate type axial plunger pump;

a cylinder member of said hydraulic pump being connected to said engine, a cylinder member of said hydraulic motor being connected to said output shaft, and a swash plate of said hydraulic pump being supported by said cylinder member of said hydraulic motor.

13. A hydraulic continuously variable speed transmission comprising:

a hydraulic pump connected to an engine;

a hydraulic motor connected to an output shaft;

a hydraulic closed circuit for hydraulically connecting the hydraulic pump and the hydraulic motor;

a direct clutch valve placed in said closed circuit to block said closed circuit;

a speed reduction ratio control actuator for varying displacements of at least one of said hydraulic pump and said hydraulic motor to control speed reduction ratio;

a direct clutch valve controlling device for controlling said direct clutch valve to block the closed circuit when the speed reduction ratio becomes substantially "1" in accordance with the actuation of the speed reduction ratio control actuator;

accelerator opening detection means for detecting an accelerator opening which indicates driver's intention of acceleration; and engine speed detection means for detecting engine speed;

wherein, said direct clutch valve controlling device releases the blocking of the closed circuit by said direct clutch valve when the engine speed detected by said engine speed detection means is less than a predetermined engine speed and also when the accelerator opening detected by said accelerator opening detection means is substantially fully closed during running with said direct clutch valve blocking the closed circuit;

wherein brake actuation detection means for detecting actuation of vehicle brakes is provided, and said predetermined speed is set higher in a case where the brake actuation detection means detects the actuation of the brakes than in a case where the brakes are unactuated;

wherein said hydraulic pump is a constant displacement swash plate type axial plunger hydraulic pump and said hydraulic motor is a variable displacement swash plate type axial plunger pump;

a cylinder member of said hydraulic pump being connected to said engine, a cylinder member of said hydraulic motor being connected to said output shaft; and a swash plate of said hydraulic pump being supported by a portion of said cylinder member of said hydraulic motor.

* * * * *